Figures 1, 2:
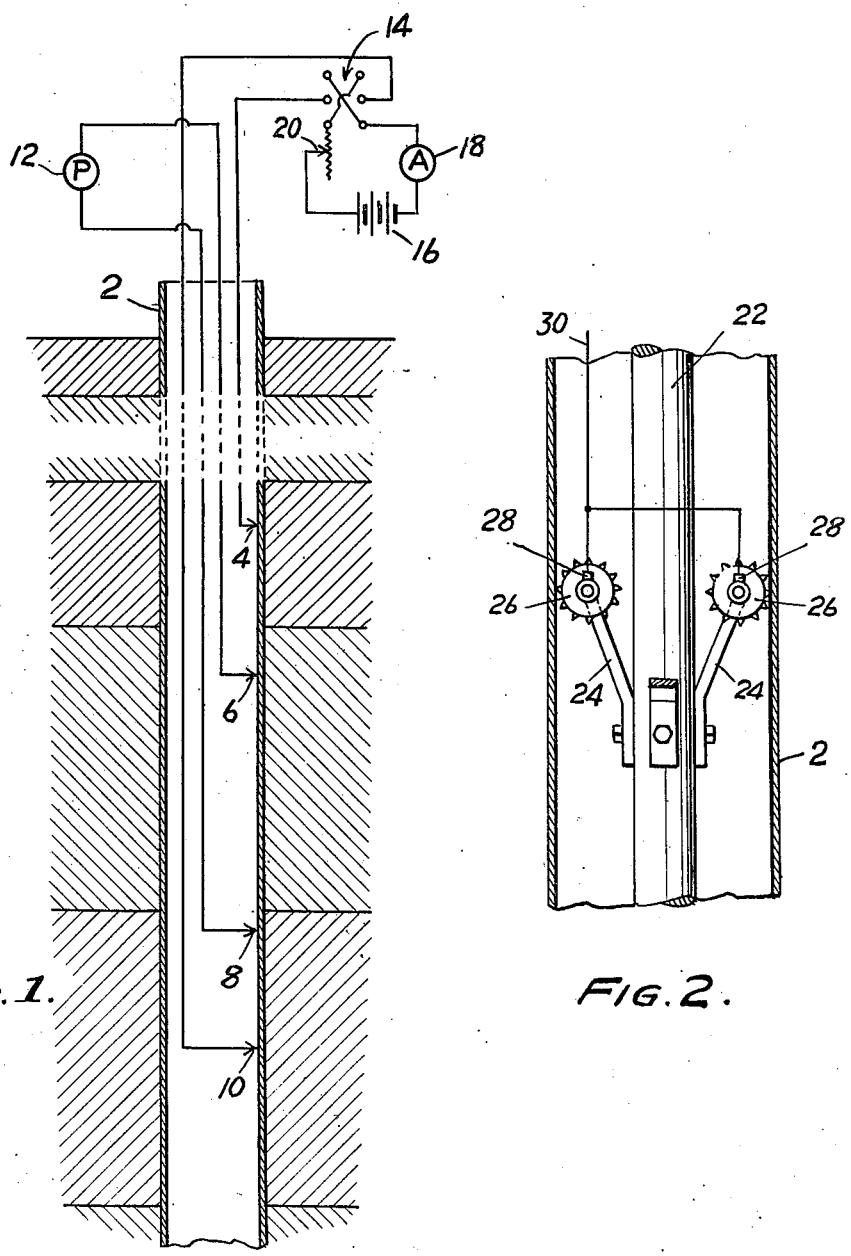

March 20, 1945. W. H. STEWART 2,371,658
METHOD AND APPARATUS FOR DETERMINING CURRENT
FLOW IN BORE HOLE CASING OR THE LIKE
Filed March 27, 1941

WITNESS:
Rob't C. Mitchel.

INVENTOR
William H. Stewart
BY
Busser & Harding
ATTORNEYS.

Patented Mar. 20, 1945

2,371,658

UNITED STATES PATENT OFFICE 2,371,658

METHOD AND APPARATUS FOR DETERMINING CURRENT FLOW IN BOREHOLE CASING OR THE LIKE

William H. Stewart, Beaumont, Tex., assignor to Sun Oil Company, Philadelphia, Pa., a corporation of New Jersey Application March 27, 1941, Serial No. 385,428

3 Claims. (Cl. 175—182)

This invention relates to a method and apparatus for determining current flow in bore hole casing or the like, and has particular reference to the determination of current flow in a casing due to remote causes which might produce destructive corrosion against which protective action should be taken.

This application is, in part, a continuation of my application Serial No. 247,139, filed December 22, 1938, for Electrical logging method and apparatus. Said application Serial No. 247,139 discloses the measurement of current flow in a casing to determine the nature of formations penetrated by the casing. In common with the method forming the primary subject-matter of this application, it involves the use of a measuring apparatus having parts movable within the casing, and claims to such apparatus generic to the two methods are included in the present application.

One object of the present invention is, accordingly, the provision of apparatus for measuring, by means located within a bore hole casing, currents flowing along the casing, either for the purpose of determining the nature of strata penetrated by the casing, or for the purpose of determining current flow with the object of preventing destructive corrosion.

A further object of the invention relates to a method and apparatus for determining the flow of current to and from a bore hole casing due to galvanic action or sources remote from the casing, which current may possibly cause corrosion. By the making of measurements of the type described, the necessary protective steps to prevent corrosion may be ascertained and carried out.

The above and other objects, relating particularly to details of the method and apparatus, will become apparent from the following description, read in conjunction with the accompanying drawing, in which:

Figure 1 is a diagrammatic sectional view illustrating the cased portion of a hole and the apparatus associated therewith for making current measurements; and Figure 2 is a vertical sectional view, somewhat diagrammatic in nature, indicating the type of arrangement utilized to secure good electrical contact of the electrodes.

Referring first to Figure 1, there is illustrated therein at 2 a cased portion of a bore hole in which measurements are to be made. This cased portion of the bore hole will be surrounded by strata of various types which, due to varying resistivities, may take some part in determining the distribution of current flow to and from the casing from sources of remote nature which may or may not be subject to control. The earth currents which flow in the casing may be due to local or remote galvanic action or to remote sources, for example, such as power lines, traction lines, or the like. In accordance with the method of the present invention so far as it relates to the determination of currents normally flowing in the casing, there is no artificial current applied to the casing except through the measuring apparatus, which engages the interior of the casing. The determination of the current flowing along the casing in any region thereof may be accomplished in various ways, of which a preferred one may be described with reference to Figure 1. With the interior of the casing there engage four electrodes 4, 6, 8 and 10, maintained in fixed spacing with respect to each other by reason of their being carried by a member 22, which will be referred to hereafter. The electrodes thus definitely spaced from each other are caused to traverse the interior of the casing and are connected by means of a multiconductor cable, in this case a cable containing four conductors, to the surface. This cable may be conventionally wound upon a drum with the ends of the conductors brought to slip rings for surface connections. Such arrangements are commonly used in connection with well logging and need not be described in detail herein.

A source of current, indicated as a battery 16, though a generator may be used instead, serves to provide current to the electrodes 4 and 10 through an ammeter 18, a rheostat 20 and a reversing switch 14.

The electrodes 6 and 8, which are intermediate 4 and 10, are connected to a sensitive galvanometer or potentiometer 12, which serves as a low reading millivoltmeter. While this has been conventionalized in the drawing, since the voltages which the galvanometer or potentiometer should be capable of indicating are of a very small order of magnitude, the electrodes may preferably be connected to a direct current amplifier which in turn feeds a sensitive galvanometer so that very minute differences of potential may be noted.

Whereas in the method described in said prior application Serial No. 247,139 the reversing switch 14 is automatically reversed in synchronism with a reversing current supply switch, in accordance with the present method, since uncontrollable direct current sources supply the current, the switch 14 is merely supplied to reverse the current flow in connection with reversals of direction of current flow which may result as movement of the electrodes along the casing takes place, i. e., the current in the upper portion of the casing may possibly be flowing in one direction, while in the lower portion flow in the opposite direction may occur. Reversal may also be provided to neutralize or prevent polarization.

In carrying out the method, the electrodes are brought to a certain level, and the current supplied by the source 16, caused to flow in the proper direction by adjustment of reversing switch 14, is adjusted by means of the rheostat 20, until the potentiometer or galvanometer, conventionalized at 12, indicates a zero potential between the intermediate electrodes 6 and 8. Under these conditions, the current which was normally flowing in this portion of the casing will be equal to the current flowing through the electrodes 4 and 10. By repetition of this operation, the current flowing may be determined as to both amount and direction at various points along the casing and from this determination made of the proper protective steps to be taken to avoid damage.

That the adjustment of the apparatus as above described causes the electrode current to equal that flowing through the portion of the casing in the vicinity of the electrodes can be most readily understood by considering that the system is of a linear type and that, therefore, in accordance with circuit theory, the currents due to various sources, if each source were used alone, may be algebraically added to determine the results if a number of sources are used simultaneously. If, for example, a certain current I was flowing through the casing between the electrodes 4 and 10 with the external remote source used alone, and, with the addition of source 16, there was zero current flowing through this portion of the casing, then it is evident that the current through this portion of the casing which would be produced by the source 16 alone would be —I. (To be accurate this would be slightly less in an actual configuration due to the distributed nature of the conductors involved.) But it will be evident that the current measured by the ammeter 18 will be —I assuming, as will be the case, that the rheostat 20 makes the resistance of the circuit of the source 16 many times higher than the resistance of a portion of the casing between the electrodes 4 and 10, so that it may be assumed that the effect of shunting of the portion of the casing between 4 and 10 by the electrode circuit is negligible. Thus under conditions of no current flow between electrodes 4 and 10, the ammeter 18 will give directly the value of the current I which would flow between the locations of the electrodes with the remote sources used alone. The condition of no current flow corresponds, of course, to no voltage drop between the electrodes 6 and 8.

Proper operation depends upon good electrical contact between the electrodes and the casing, this being particularly necessary in the case of the electrodes which are used for introducing current, i. e., electrodes 4 and 10. Accordingly, there has been illustrated in Figure 2 in a diagrammatic fashion a preferred arrangement adapted to secure good contact. This comprises a member 22, which is arranged to carry all of the electrodes in fixed relationship with each other as indicated above. Each of the electrodes may comprise a plurality of wheel members 26 provided with sharp points and preferably in the nature of cutters which will cut away rust and coating materials in the inside of the casing, biting down into the metal of the casing. These electrodes are mounted in insulating bushings in the ends of heavy spring members 24 secured to the carrier 22 and adapted to urge the electrode members 26 into contact with the casing walls. Suitable brushes indicated at 28 are mounted to contact with the members for connection to the conductors 30 within the cable supporting the carrier 22 and extending to the surface. It may be remarked that while the apparatus will generally be operated with aqueous liquid within the casing, which will be conductive, nevertheless, the conductivity of such a liquid will be very low compared with the metallic conductivity between the electrodes and casing and through the casing, so that its effect in short circuiting the electrodes may be completely neglected.

What I claim and desire to protect by Letters Patent is:

1. The method of determining the flow to and from a casing located in a bore hole of earth currents due to galvanic action or sources remote from the casing comprising lowering into the casing means for producing a flow of current along the casing between spaced points in the interior of the casing from an artificial current source while the only other sources of current flow in the casing are those causing said earth currents of galvanic or remote origin, adjusting said source to attain a condition of no current flow between said spaced points, and determining the current introduced from said source when said condition is attained.

2. The method of determining the flow to and from a casing located in a bore hole of earth currents due to galvanic action or sources remote from the casing comprising lowering into the casing means for producing a flow of current along the casing between spaced points in the interior of the casing from an artificial current source while the only other sources of current flow in the casing are those causing said earth currents of galvanic or remote origin, adjusting said source to attain a condition of no potential drop between two other spaced points located between the first mentioned spaced points, and determining the current introduced from said source when said condition is attained.

3. The method of determining the flow of current along a metallic casing lining a bore hole comprising lowering into the casing means for applying a voltage between two points in the casing to reduce to substantially zero current flowing along the casing between the points, and observing, by means lowered within the casing, the attainment of said zero current by absence of voltage drop between points located between the first mentioned points.

WILLIAM H. STEWART.